US006358876B1

(12) United States Patent
Alt et al.

(10) Patent No.: US 6,358,876 B1
(45) Date of Patent: Mar. 19, 2002

(54) ORGANO-ALUMINUM COMPOUNDS IMMOBILIZED ON ORGANOPOLYSILOXANE MICROGEL PARTICLES

(75) Inventors: Helmut Alt, Bayreuth; Frank Baumann, Mehring; Johann Weis, Sauerlach; Alexander Köppl, Bayreuth, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/508,221

(22) PCT Filed: Sep. 17, 1998

(86) PCT No.: PCT/EP98/05920

§ 371 Date: Apr. 19, 2000

§ 102(e) Date: Apr. 19, 2000

(87) PCT Pub. No.: WO99/14269

PCT Pub. Date: Mar. 25, 1999

(30) Foreign Application Priority Data

Sep. 18, 1997 (DE) ........................................ 197 41 201

(51) Int. Cl.[7] .......................... B01J 31/00; B01J 37/00; C08F 4/02; C08F 4/60

(52) U.S. Cl. ...................... 502/159; 502/158; 502/152; 502/109; 526/159; 526/194; 526/226; 526/279

(58) Field of Search ................................ 502/109, 158, 502/159

(56) References Cited

U.S. PATENT DOCUMENTS 3,755,274 A 8/1973 Piekarski et al.
4,688,889 A * 8/1987 Pasini et al. ................ 502/159
4,925,821 A 5/1990 Chang
4,945,076 A 7/1990 Piotrowski et al.
5,206,401 A 4/1993 Deavenport et al.
5,633,217 A * 5/1997 Lynn .......................... 502/159
5,789,334 A * 8/1998 Nakanishi et al. .......... 502/158
5,792,723 A * 8/1998 Ikeno et al. ................ 502/158
5,994,570 A * 11/1999 Ogawa et al. .............. 502/158
6,251,969 B1 * 6/2001 Worner et al. .............. 502/158

FOREIGN PATENT DOCUMENTS

EP 0 744 432 A1 11/1996
EP 0 755 936 A2 1/1997
FR 2139015 1/1973
GB 906425 * 9/1962 ................. 502/158

OTHER PUBLICATIONS

Derwent Abstract Corresponding To EP 0 744 432 A1 (AN 1997 —001220).

* cited by examiner

*Primary Examiner*—Mark L. Bell
*Assistant Examiner*—J. Pasterczyk
(74) *Attorney, Agent, or Firm*—Brooks & Kushman P.C.

(57) ABSTRACT

The invention relates to particles comprises of organopolysiloxane microgel particles having a diameter of 5 to 200 nm and organo-aluminum compounds immobilized thereon. The particles can be used as cocatalysts together with metal compounds of the 4, 5, 6 and 8–10 sub-groups of the periodic table for oligomerization, cyclization of polymerization of olefins.

21 Claims, No Drawings

ORGANO-ALUMINUM COMPOUNDS IMMOBILIZED ON ORGANOPOLYSILOXANE MICROGEL PARTICLES

TECHNOLOGICAL FIELD

The invention relates to particles comprising organopolysiloxane gel microparticles and organoaluminum compounds immobilized thereon, to their preparation, and to their use as cocatalysts together with metal compounds from sub-groups 4, 5, 6 and 8–10 of the Periodic Table, for the oligomerization, cyclization or polymerization of olefins.

DESCRIPTION OF THE RELATED ART

Aluminoxanes are obtained by controlled hydrolysis of organoaluminum compounds. For example, oligomeric methylaluminoxane is prepared by controlled hydrolysis of trimethylaluminum using water.

Organoaluminoxanes have a broad range of application as cocatalysts in metalcatalyzed olefin oligomerization, cyclization or polymerization using metal compounds from sub-groups 4, 5, 6 and 8–10 of the Periodic Table, where the added organoaluminoxane serves as activator for the catalytically active metal compound. In U.S. Pat. No. 5,206,401, for example, methylaluminoxanes are added to catalytically active metallocene compounds of metals from sub-group 4 of the Periodic Table as activators for olefin polymerization.

When carrying out metal-catalyzed olefin polymerization activated by organoaluminoxane, for example using metallocene or semisandwich catalysts, a recurring problem is that of reactor fouling, i.e. during the reaction, the reactor walls become coated with the polyolefin formed. Temperature control during the reaction is no longer possible. The deposits ultimately result in the reactor blocking up completely. In large-scale industrial production, this results in plant shutdowns and thus high costs. Another problem in the preparation of polyolefins is the morphology of the product obtained. Without further additives, a finely pulverulent product is obtained. For further industrial processing, however, the polymer should be produced in larger particle sizes, preferably having a spherical shape with a mean sphere diameter of 0.1 to 3 mm.

Reactor fouling can be suppressed by carrying out the immobilization of the active catalyst center by applying the cocatalyst, such as methylaluminoxane (MAO) or ethylaluminoxane, to silica gel. This is described, for example, in U.S. Pat. No. 4,925,821. The heterogenization of the cocatalyst means that the actual polymerization-active cationic reaction center is quasi-heterogenized via an ionic interaction with the anionic organoaluminoxane.

The heterogenization is carried out in a multiphase reaction; wetting problems, long reaction times, incomplete reaction and difficult reaction control and end-point determination of the reaction must be accepted. Furthermore, the heterogenization of the cocatalyst causes a significant reduction in the catalytic activity. Likewise, the cocatalyst in metalcatalyzed reactions of olefins must be added in a large excess, namely in a molar ratio of from 1:1000 to 1:20,000. The ratio between catalytically active metal and cocatalyst is rather random and cannot be set precisely.

The object was to provide organoaluminum compound-carrying particles which, when used as cocatalysts together with metal compounds, have high catalytic activity in the polymerization, oligomerization or cyclization of olefins, where it should be possible to control precisely the amount of organoaluminum compound-carrying particles employed, i.e. the ratio between the active metal center and aluminum.

SUMMARY OF THE INVENTION

The invention relates to p articles comprising organopolysiloxane gel microparticles having a diameter of from 5 to 200 nm and organoaluminum compounds immobilized thereon.

The novel particles are, after their preparation, at least finely suspendable or soluble in all inert organic solvents. The size of the particles is from 10 nm for individual particles up to 500 microns for agglomerates.

DETAILED DESCRIPTION OF THE PREFERRED EMBODIMENT(S)

The particles are preferably composed of [organosiloxane gel microparticle content]$_a$[aluminoxane content]$_b$ [monomeric and oligomeric organoaluminum compound]$_c$, where

- a is from 1 to 99.9% by weight
- b is from 1 to 99% by weight and
- c is from 0 to 10% by weight, with the proviso that the individual components add up to 100% by weight.

a is preferably at most 50% by weight, in particular at most 20% by weight. b is preferably at least 10% by weight, in particular at least 50% by weight. b is preferably at most 90% by weight. c is preferably at least 0.1% by weight, in particular at least 0.5% by weight, and particularly preferably at least 2% by weight. c is preferably at most 5% by weight.

The organopolysiloxane content of the particles preferably consists of from 0.5 to 80% by weight of units of the general formula $$[R^1_dR^2_{3-d}SiO_{1/2}] \quad (1),$$

from 0 to 99.0% by weight of units of the general formula $$[R^1_eR^2_{2-e}SiO_{2/2}] \quad (2),$$

from 0 to 99.5% by weight of units of the general formula $$[R^1_fR^2_{1-f}SiO_{3/2}] \quad (3) \text{ and}$$

from 0 to 99.5% by weight of units of the general formula $$[SiO_{4/2}] \quad (4),$$

where

- $R^1$ are identical or different monovalent, Si—O—C-bonded $C_1$- to $C_{30}$-hydrocarbon radicals optionally carrying functional groups, or hydrogen,
- $R^2$ are identical or different monovalent, SiC-bonded $C^1$- to $C_{30}$-hydrocarbon radicals optionally carrying functional groups and optionally also interrupted by the heteroatoms O, N or S, or hydrogen,
- d has the value 0, 1, 2 or 3
- e has the value 0, 1 or 2, and
- f has the value 0 or 1.

Examples of unsubstituted radicals $R^1$ are alkyl radicals, such as the methyl, ethyl and propyl radicals; cycloalkyl radicals, such as cyclohexane radical; and aryl radicals, such as the phenyl radical.

Examples of radicals $R^1$ carrying functional groups are halogenated hydrocarbon radicals, preferably haloalkyl radicals, such as the 3,3,3-chloromethyl, 3-chloropropyl, 3-bromopropyl, 3,3,3-trifluoropropyl and 5,5,5,4,4,3,3-heptafluoropentyl radicals.

The radical $R^1$ is in particular an unsubstituted $C_1$- to $C_6$-alkyl radical, a phenyl radical or hydrogen, in particular the methyl radical.

Examples and preferred examples of unsubstituted radicals $R^2$ are the radicals indicated above for $R^1$.

Examples of hydrocarbon radicals $R^2$ carrying functional groups are halogenated hydrocarbon radicals, namely haloalkyl radicals, such as the 3,3,3-chloromethyl, 3-chloropropyl, 3-bromopropyl, 3,3,3-trifluoropropyl and 5,5,5,4,4,3,3-heptafluoropentyl radicals, and haloaryl radicals, such as the o-, m- and p-chlorophenyl radicals; hydrocarbon radicals carrying primary, secondary and tertiary amines, for example aminoalkyl radicals, such as the 2-aminoethyl, 3-aminopropyl, N-(2-aminoethyl)-3-aminopropyl, N-(2-aminoethyl)-3-amino-(2-methyl)propyl and pyrimidinyl radicals, aminoaryl radicals, such as the aminophenyl radical; quaternary ammonium radicals; hydrocarbon radicals carrying mercapto groups, such as the 2-mercaptoethyl and 3-mercaptopropyl radicals; cyanoalkyl radicals, such as the 2-cyanoethyl and 3-cyanopropyl radicals; hydrocarbon radicals carrying acrylyl groups, for example acryloxyalkyl radicals, such as 3-acryloxypropyl and 3-methacryloxypropyl radicals; hydrocarbon radicals carrying hydroxyl groups, for example hydroxyalkyl radicals, such as the hydroxypropyl radical; hydrocarbon radicals carrying phosphonic acid, phosphonato and sulfonato groups; saturated and unsaturated, linear and cyclic hydrocarbon radicals interrupted by the heteroatoms O, N or S, such as the furanyl, pyridyl and thiophenyl radicals.

Radical $R^2$ is preferably an unsubstituted $C^1$- to $C_6$-alkyl radical or the phenyl radical, in particular the methyl, ethyl or propyl radical.

Further main-group elements, such as boron and aluminum, can be attached to $R^1$ via an Si—O—C bond or to a further oxygen atom of the hydrocarbon radicals $R^1$ and $R^2$ carrying functional groups.

The aluminoxane content of the particles preferably consists of from 0.5 to 99% by weight of units of the general formula $$[X_iR^4_gR^3_{2-g}AlO_{1/2}] \quad (5),$$

from 0 to 99% by weight of units of the general formula $$[X_jR^4_hR^3_{1-h}AlO_{2/2}] \quad (6) \text{ and}$$

from 0 to 99% by weight of units of the general formula $$[AlO_{3/2}] \quad (7),$$

where $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, g has the value 0, 1 or 2, h has the value 0 or 1, i has the value 0, 1, 2 or 3, and j has the value 0, 1 or 2.

h and g are preferably 0.

X is preferably a chlorine or fluorine atom.

Examples and preferred examples of radicals $R^3$ are the alkyl, cycloalkyl and aryl radicals listed above for $R^1$ and halogenated hydrocarbon radicals.

In particular, $R^3$ is an unsubstituted $C_1$- to $C_{10}$-alkyl radical, phenyl radical or hydrogen, in particular the methyl, ethyl, propyl, isopropyl, butyl, isobutyl, hexyl or decyl radical.

Examples of unsubstituted radicals $R^4$ are the alkyl, cycloalkyl and aryl radicals listed above for $R^1$.

Examples of radicals $R^4$ carrying functional groups are halogenated hydrocarbon radicals, such as the halogenated hydrocarbon radicals listed above for $R^1$, and 1,3-diketone adducts.

The radical $R^4$ is preferably an unsubstituted $C_1$- to $C_6$-alkyl radical or the phenyl radical, in particular the methyl, ethyl or isobutyl radical.

The monomeric, organoaluminum compound content of the particles preferably consists of compounds of the general formulae $$R^3_{3-i-j}R^4_{i-j}AlX_j \quad (8)$$

$$R^5_2AlER^5ER^5 \quad (9),$$

$$(CH_2)_sAl\text{-}ER^5 \quad (10),$$

(11)

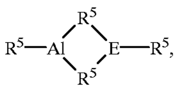

(12)

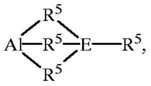

where $R^5$ is a $C_1$- to $C_{30}$-hydrocarbon radical,

Y is a group having a free pair of electrons, selected from oxygen, sulfur and $NR^6$, $R^6$ is a hydrogen atom or a radical $R^5$, s is an integer from 3 to 30, and $R^3$, $R^4$, X, i and j are as defined above.

The oligomeric, cyclic organoaluminum compound content of the particles preferably consists of compounds of the general formula $$(R^3AlO_{2/2})_k(R^4AlO_{2/2})_l(XAlO_{2/2})_m \quad (13),$$

where k, l and m are each an integer from 3 to 30, with the proviso that the sum k+l+m is at least three, and $R^3$, $R^4$, X, i and j are as defined above.

The oligomeric, linear organoaluminum compound content of the particles preferably consists of compounds of the general formula $$R^3_{2-q-r}R^4_{q-r}X_rAlO—(R^3AlO_{2/2})_n(R^4AlO_{2/2})_o(XAlO_{2/2})_pAlR^3_{2-q-r}R^4_{q-r}X_r \quad (14),$$

where n, o and p are each integers from 0 to 50, q and r each have a value of 0, 1 or 2, and $R^3$, $R^4$ and X are as defined above.

The radical $R^5$ is preferably a $C_1$- to $C_{10}$-alkyl radical or the phenyl radical, in particular the methyl, ethyl, propyl, isopropyl or butyl radical.

The monomeric aluminum compounds are preferably triorganoaluminum compounds containing $C_1$- to $C_{10}$-alkyl radicals, such as trimethylaluminum, triethylaluminum, triisobutylaluminum and tridecylaluminum; diorganoaluminum hydride compounds containing $C_1$- to $C_{10}$-alkyl radicals, such as dimethylaluminum hydride and didecylaluminum hydride; organoaluminum dihydride compounds, such as methylaluminum hydride; diorganoaluminum halides, such as dimethylaluminum chloride; organoaluminum dihalides, such as methylaluminum dichloride; and organoaluminum sesquihalides, such as trimethyldialuminum dichloride.

Particular preference is given here to triorganylaluminum compounds containing $C_1$- to $C_{10}$-alkyl radicals, in particular trimethylaluminum, triethylaluminum, tripropylaluminum, triisopropyl-aluminum, tri-n-butylaluminum and tridecylaluminum.

The particles preferably contain at least 5% by weight of aluminoxane and the remaining units of the particles consist of from 1 to 80% by weight of units of the general formula (1), from 0 to 98% by weight of units of the general formula (2), from 0 to 99% by weight of units of the general formula (3) and from 0 to 99% by weight of units of the general formula (4), with the proviso that the sum of the units of the general formulae (3) and (4) is at least 1% by weight.

The particles can also contain monomeric aluminum starting compounds in an amount of from 0.01 to 50% by weight, in particular up to 10% by weight, relative to the total weight of the particles.

The invention furthermore relates to a process for the preparation of particles comprising organopolysiloxane gel microparticles having a diameter of from 5 to 200 nm and organoaluminum compounds immobilized thereon, in which organoaluminum compounds selected from compounds of the above general formulae (8) to (13) are reacted with compounds carrying hydroxyl groups in the presence of organopolysiloxane gel microparticles having a diameter of from 5 to 200 nm.

Suitable organopolysiloxane gel microparticles are preferably composed of units of the above general formulae (1) to (4). For example, the organopolysiloxane gel microparticles are methyl-, ethyl-, phenyl- or vinylpolysiloxane gel microparticles.

Particularly suitable organopolysiloxane particles for the preparation of the novel particles are those described in EP-A-744 432. Particular preference is given to the organopolysiloxane particles which are soluble to the extent of at least 5% by weight in hydrocarbons, such as aromatic, unsubstituted hydrocarbons, such as toluene, benzene and xylene, unsubstituted, aliphatic hydrocarbons, such as pentane, isopentane, isobutane, hexane and cyclohexane, in particular toluene, at 20° C.

The organopolysiloxane particles employed may be free from reactive groups, such as hydroxyl and alkoxy groups, and only contain hydrocarbon radicals.

Other very suitable organopolysiloxane particles are those described in EP-A-744 432 which contain a total of more than 15% by weight of units of the above general formulae (1) to (4) which carry one or three Si—C-bonded radicals $R^2$ and have not been freed from residual OH or hydrocarbonoxy groups in a third step.

The organoaluminum compounds of the general formulae (8) to (13) which can be used react with compounds containing hydroxide [sic] groups to form aluminoxanes.

The organoaluminum compounds can be employed in the form of solids, liquids or gases. They are preferably used in the form of liquids or in solution.

Preference is given to the monomeric organoaluminum compounds described above as preferred under the general formulae (8) to (13).

If the organoaluminum compounds are employed in solution, preferred solvents are the hydrocarbons which are listed above as preferred solvents for the organopolysiloxane gel microparticles.

The organopolysiloxane gel microparticles are preferably also employed dissolved in the above-described hydrocarbons.

The dissolved reaction partners are preferably then mixed. If desired, the organoaluminum compounds can also be dissolved directly in the organopolysiloxane gel microparticle solution.

The preferred concentrations of organopolysiloxane gel microparticles and of the organoaluminum compounds are at least 1% by weight, at most 50% by weight, in particular at most 30% by weight, particularly preferably at most 20% by weight, based on the total weight of the solution.

The compounds carrying hydroxide [sic] groups are preferably water, $C_1$- to $C_{40}$-hydrocarbons carrying hydroxide [sic] groups, such as primary, secondary and tertiary alcohols, diols, triols, phenols and sugars, or inorganic compounds carrying hydroxide [sic] groups, such as boric acid or aluminum hydroxide. Particular preference is given to water, which can be added as such in solid, liquid or gas form, as water of crystallization, or as an emulsion or microemulsion.

The molar ratios between hydroxyl groups and the organoaluminum compound is preferably varied in a molar ratio of from 0.01:1 to 10:1.

The compounds carrying hydroxyl groups are preferably added with stirring. The temperatures during this addition are preferably from −80° C. to 250° C., in particular from −20° C. to 100° C., and particularly preferably from −40° C. to 0° C.

The reactions are then preferably continued at a temperature in the range from −80° C. to 200° C., in particular at a temperature in the range from −80° C. to 140° C., particularly preferably at a temperature in the range from 0° C. to 80° C.

The reaction can be carried out with mixing, but can also be carried out without mixing. Mixing of the reaction solution is preferred.

The reaction times are between a few minutes and one day, preferably between one hour and ten hours, particularly preferably between 5 minutes and two hours. The end point of the reaction can be determined from the end of gas evolution.

When a solvent is used during the reaction, the finished particles form a suspension, which can be employed for further reactions or uses, for example as cocatalyst.

The finished particles can also preferably be filtered off under an inert-gas atmosphere, preferably argon, and at the abovementioned temperatures, and rinsed with a solvent, such as a hydrocarbon.

The filter cake can preferably then be dried in a high vacuum, for example at room temperature. The cocatalyst can also, if desired, be stored under an inert gas in the moist state without further drying.

Another variant of the work-up is removal of the solvent under reduced pressure.

The invention furthermore relates to the use of the particles as cocatalysts together with metal compounds from sub-group 4, 5, 6 and 8–10 of the Periodic Table, for the oligomerization, cyclization or polymerization of olefins.

The metal catalysts from sub-group 4, 5, 6 and 8–10 of the Periodic Table and the particles as cocatalysts are used to prepare an immobilized and activated catalyst system, preferably in an inert solvent, in particular in a hydrocarbon, namely an aromatic, unsubstituted hydrocarbon, such as toluene, benzene or xylene, or an unsubstituted, aliphatic hydrocarbon, such as pentane, isopentane, isobutane, hexane or cyclohexane, in particular toluene.

To this end, the particles are, for example, employed directly in the suspension obtained from the preparation or are suspended, dispersed or partially dissolved in a suitable inert solvent, preferably under an inert gas, such as argon. Suitable inert solvents are the abovementioned hydrocarbons. Particles are then mixed with metal catalyst, preferably with stirring. The metal catalyst can be in the solid state or suspended, dispersed, partially dissolved or dissolved in a suitable inert solvent, in this case the above hydrocarbons are preferred.

The mixing of the particles with the metal catalyst can be carried out at from −80° C. to 200° C. Preference is given to a temperature range of from −40° C. to 60° C., in particular at temperatures of 0° C. to 30° C. The temperature during the subsequent reaction is preferably in the above-described temperatures ranges.

Mixing can take place during the reaction, but the reaction can also be carried out without mixing. Preference is given to mixing of the reaction solution. The reaction times are preferably from 1 minute to one day, preferably from 1 minute to 10 hours, particularly preferably from 1 minute to 2 hours.

The immobilized and activated catalyst system is preferably filtered off at the abovementioned temperatures, preferably under an inert-gas atmosphere, in particular argon, and is preferably rinsed with an inert solvent, such as the abovementioned hydrocarbons. The colored filter cake can then be dried in a high vacuum, preferably at from −50° C. to 100° C. The immobilized and activated catalyst system can, if desired, also be stored under an inert gas in the moisture state without further drying.

The ratio between metal in the metal catalyst and aluminum in the particles can be set to any desired value. This ratio can be determined by elemental analysis.

The metal compounds used are preferably metallocenes and semisandwich compounds of the sub-group metals of the Periodic Table. Such metal compounds are described, for example, in U.S. Pat. No. 4,925,821. Preference is given to metal compounds containing cyclopentadienyl ligands. Preferred metals in the metal compounds are titanium, zirconium, vanadium and niobium.

The invention furthermore relates to the use of the particles as cocatalysts, together with metal compounds from sub-groups 4, 5, 6 and 8–10 of the Periodic Table, for the oligomerization, cyclization or polymerization of olefins.

The metal catalysts from sub-group 4, 5, 6 and 8–10 of the Periodic Table and the particles as cocatalysts are used to prepare an immobilized and activated catalyst system, preferably in an inert solvent, in particular in a hydrocarbon, namely an aromatic, unsubstituted hydrocarbon, such as toluene, benzene or xylene, or an unsubstituted, aliphatic hydrocarbon, such as pentane, isopentane, isobutane, hexane or cyclohexane, in particular toluene.

The particles and the immobilized and activated catalyst systems prepared therewith together with metal compounds can be dried immediately after their preparation, used without drying or employed only after storage for any desired time, without any drop in activity, for the oligomerization, cyclization or polymerization of olefins, in batch processes or continuous processes.

For the polymerization of olefins, these catalyst systems are introduced into the reactor at the outset or added continuously, as a suspension with solvent or without solvent for a gas-phase reaction or fluidized-bed process. Solvents which are suitable for the polymerization of olefins are the inert hydrocarbons described above. The olefin to be polymerized, such as propene, can itself also serve as solvent.

In the next step of olefin polymerization, the monomer or monomer mixture, if it is not already present as solvent, is added in one portion or continuously or, in the case of copolymerizations, successively, in solid, liquid or gas form.

Examples of suitable olefins are, depending on the catalyst system used, linear or cyclic $C_2$- to $C_{30}$-mono-1-olefins, such as ethylene, propylene, 1-hexene, cyclopentene, cyclohexene and norbornene, likewise polyunsaturated, linear or cyclic $C_4$- to $C_{30}$-olefins, such as 1,3-butadiene, isoprene, 1,3-pentadiene, styrene, α-methylstyrene and norbornadiene. All the above olefins can be homopolymerized and copolymerized in any desired ratios.

The reaction can be carried out with mixing. The reaction temperature is preferably from −80° C. to 200° C., in particular from 0° C. to 140° C., particularly preferably from 60° C. to 120° C. The pressure during the reaction can preferably be varied from 1 bar to 400 bar.

The product obtained can be processed further without further work-up. If desired, the polymer can also be subsequently treated with alkaline, aqueous media, such as sodium hydroxide solution, but this is not preferred.

In the examples below, unless otherwise specified, a) all amounts are by weight b) all pressures are 0.10 MPa (abs.)

c) all temperatures are 20° C.

EXAMPLES

All work is carried out under a protective gas (argon). The solvents used were freshly distilled over Na/K alloy under protective gas.

| | List of chemicals employed | Company/literature |
|---|---|---|
| a) | $Cp_2ZrCl_2$ | Merck, 8.03027.0005 |
| b) | $[FluCMe_2Cp]ZrCl_2$ | J. A. Ewen, JACS (1988) 110, 6255 |
| c) | $[FluSiMe_2Flu]ZrCl_2$ | S. J. Palackal, dissertation, Univ. Bayreuth 1991 |
| d) | $[Flu\text{-}C_2H_4\text{-}Flu]ZrCl_2$ | S. J. Palackal, dissertation, Univ. Bayreuth 1991 |
| e) | $[(2,6\text{-}{}^iPr_2Ph)N{=}CH{-}CH{=}N(2,6\text{-}{}^iPr_2Ph)]NiBr_2$ | WO-A-96/23010 |
| f) | trimethylaluminum | Merck, 8.14110.0150 |
| g) | Me-μ-gel | Organopolysiloxane particles as described in EP-A-744 432 in Example 1 |

Example 1

(Water is added as such):

2.0 g of Me-μ-gel are dissolved in 250 ml of toluene, and 30 ml of a 2 molar solution of trimethylaluminum (TMA) in toluene are added. The dispersion is stirred at room temperature for one hour and cooled to −78° C. 0.75 ml of water are then slowly added dropwise. When the evolution of gas is complete, the mixture is stirred at room temperature for 4 hours, filtered, washed twice with pentane and dried in a high vacuum. Yield: 85% (based on TMA) of a white solid.

Example 2

(Water is added in gas form):

2.0 g of Me-$\mu$-gel are dissolved in 250 ml of toluene, and 30 ml of a 2 molar solution of trimethylaluminum (TMA) in toluene are added. The dispersion is stirred at room temperature for one hour and heated to 40° C. 0.75 ml of water is then added to the dispersion by means of a saturated stream of argon. When the gas evolution is complete, the mixture is stirred at room temperature for 4 hours, filtered, washed twice with pentane and dried in a high vacuum. Yield: 100% of a white solid.

Example 3

(Olefin polymerization):

The solids from Examples 1 and 2 can be employed as heterogeneous cocatalysts. To this end, 0.5 g of the white solid from Ex. 1 or Ex. 2 is suspended in 500 ml of pentane, and 0.001 mmol of catalyst precursor ($Cp_2ZrCl_2$) in toluene solution is added. The suspension is used directly for the polymerization (1 l reactor, ethylene pressure of 10 bar, 60 min., 60° C.), (Al:Zr=300:1).

Polymerization experiments:

| | Activity [kg of PE/mmol h] | Fouling |
|---|---|---|
| Example 1 | 0.8 | no |
| Example 2 | 0.7 | no |

Example 4

(Cocatalyst is reacted directly with the catalyst precursors without purification):

2.0 g of Me-$\mu$-gel are dissolved in 250 ml of toluene, and 30 ml of a 2 molar solution of trimethylaluminum (TMA) in toluene are added. The dispersion is stirred at room temperature for one hour and heated to 40° C. 0.75 ml of water is then added to the dispersion by means of a saturated stream of argon. When the gas evolution is complete, the mixture is stirred at room temperature for 4 hours. 0.2 mmol of a metallocene dichloride complex is added as a solid and activated for 30 minutes. The mixture is then filtered, washed twice with pentane and dried in a high vacuum. Yield: 100% of a solid with a color depending on the metallocene dichloride complex.

Metallocene dichloride complexes used (Al:Zr=300:1):

a) $Cp_2ZrCl_2$ $Cp=C_5H_5$ $^iPr$=isopropyl b) $[FluCMe_2Cp]ZrCl_2$ $Flu=C_{13}H_8$ Ph=phenyl c) $[FluSiMe_2FluZrCl_2$ d) $[Flu\text{-}C_2H_4\text{-}Flu]ZrCl_2$ e) $[(2,6\text{-}^iPr_2Ph)N{=}CH{-}CH{=}N(2,6\text{-}^iPr_2Ph)]NiBr_2$ Example 5

(Olefin polymerization using the catalysts prepared in Example 4):

The olefin polymerization is carried out analogously to Example 3.

Polymerization results (1 l reactor, ethylene pressure of 10 bar, 60 min., 60° C.):

| Number | Activity [kg of PE/mmol h] |
|---|---|
| Example 3, a | 1.0 |
| Example 3, b | 0.2 |
| Example 3, c | 1.5 |
| Example 3, d | 2.0 |
| Example 3, e | 0.1 |

Fouling did not occur in any of the polymerization experiments.

Example 6

(Comparative Example: dry silica gel as support material):

30 ml of a 30% MAO solution (% by weight in toluene) are added to 3.0 g of silica gel which has been dried by heating, and the mixture is stirred at room temperature for 4 hours. The mixture is then filtered and washed twice with 25 ml of both toluene and pentane. Drying in a high vacuum gives 4.55 g of a colorless powder.

Example 7

(Comparative Example: water-containing silica gel as support material):

Trimethylaluminum is added to 2.0 g of silica gel which has not been dried by heating (Merck, water content about 7%), and the mixture is stirred at 50° C. for 4 hours. The mixture is then filtered and washed twice with 25 ml of both toluene and pentane. Drying in a high vacuum gives 3.25 g of a colorless powder.

Example 8

(Olefin polymerization using the cocatalyst systems prepared in Examples 6 and 7):

The polymerization experiments are analogous to the polymerizations described in Example 3 (1 l reactor, 500 ml of pentane, ethylene pressure of 10 bar, 60 min., 60° C.)

Catalyst precursors: $Cp_2ZrCl_2$

| Example | Al:Zr | Activity $[kg^{PE}/mmol^{Zr}h]$ |
|---|---|---|
| 8a | 7000:1 | 0.2 |
| 8b | 300:1 | 0 |
| 8c | 300:1 | 0.02 |

Examples 8b and 8c show, by comparison with Example 4, that, for comparable Al:Zr ratios, the catalytic activity of the novel cocatalyst is orders of magnitude higher.

Example 9

(Comparative Example):

1.) Preparation of resins:

209 g (1 mol) of tetraethoxysilane and a disiloxane or disiloxane mixture are mixed in a 2 1 flask at room temperature. 51.3 g of water and 0.46 g of a 20% aqueous hydrogen chloride solution are added to the mixture. The flask is warmed to 65° C. and held at this temperature for 2 hours. 115 g of ethanol are then distilled off at 900 mbar. 150 g of toluene are added to the reaction solution, and the mixture is neutralized using sodium hydroxide solution. The reaction solution is then held at 70° C. for two hours. The solution is then filtered and the solvent is evaporated off. In all cases, white, toluene-soluble powders having a particle diameter of 2–3 nm are obtained.

TABLE 1

MQ resins prepared by the method described above

| Sample | Disiloxane | Molar M:Q ratio | Functional group |
| --- | --- | --- | --- |
| MQ1 | 88.6 g of hexa-methyldisiloxane | 0.5:1 | methyl |
| MQ2 | hexamethyldisil-oxane/tetra-methyldivinyl-disiloxane | 0.6:1 | methyl/vinyl |
| MQ3 | tetramethyl-divinyldisiloxane | 0.5:1 | vinyl |
| MQ4 | tetramethyl-disiloxane | 0.45:1 | hydrogen |

2.) Preparation of the immobilized cocatalysts

The cocatalysts are prepared as described in Example 1, giving four samples CoMQ1, CoMQ2, CoMQ3 and CoMQ4.

3.) Samples CoMQ1 to CoMQ4 are treated further as described in Example 4. The catalyst precursor used here is only complex 4a from Example 4.

4.) The olefin polymerization is carried out analogously to Example 3. The activities obtained are shown in Table 2.

TABLE 2

Polymerization experiments at an Al:Zr ratio of 300:1

| Cocatalysts | Activity [kg PE/mmol$^{Zr}$h] | Fouling |
| --- | --- | --- |
| CoMQ1 | 0.1 | no |
| CoMQ2 | 0.2 | no |
| CoMQ3 | 0.1 | no |
| CoMQ4 | 0.02 | slight |

As can be seen from Table 2, the activities are a factor of 5–10 times lower in comparison with the activities obtained for catalyst 3a in Example 5 for comparable Al:Zr ratios. In addition, slight reactor fouling occurs in the case of CoMQ4, i.e. the reactor walls are covered by a PE layer with a thickness of approximately 1 mm.

What is claimed is:

1. Particles comprising organopolysiloxane gel microparticles, said microparticles having a diameter of from 5 nm to 200 nm, said organopolysiloxane having one or more organoaluminum compounds immobilized thereon.

2. The particles of claim 1, wherein said organoaluminum compounds comprise alumoxanes and monomeric and oligomeric organoaluminum compounds, said particles comprising [organopolysiloxane gel microparticle content]$_a$ [aluminoxane content]$_b$ [monomeric and oligomeric organoaluminum compound]$_c$, where a is from 1 to 99.9% by weight b is from 1 to 99% by weight and c is from 0 to 10% by weight, the percents by weight based on the total weight of said particles.

3. The particles of claim 2, wherein the organopolysiloxane gel microparticles comprise from 0.5 to 80% by weight of units of the general formula $$[R^1_d R^2_{3-d} SiO_{1/2}] \quad (1),$$

from 0 to 99.0% by weight of units of the general formula $$[R^1_e R^2_{2-e} SiO_{2/2}] \quad (2),$$

from 0 to 99.5% by weight of units of the general formula $$[R^1_f R^2_{1-f} SiO_{3/2}] \quad (3) \text{ and}$$

from 0 to 99.5% by weight of units of the general formula $$[SiO_{4/2}] \quad (4),$$

where $R^1$ are hydrogen or identical or different monovalent, Si—O—C-bonded $C_1$- to $C_{30}$-hydrocarbon radicals optionally carrying functional groups, $R^2$ are hydrogen or identical or different monovalent, SiC-bonded $C_1$- to $C_{30}$-hydrocarbon radicals optionally carrying functional groups and optionally also interrupted by the heteroatoms O, N or S, d has the value 0, 1, 2 or 3 e has the value 0, 1 or 2, and f has the value 0 or 1.

4. The particles of claim 2, wherein the aluminoxane content of the particles comprises from 0.5 to 99% by weight of units of the general formula $$[X_i R^4_g R^3_{2-g-i} AlO_{1/2}] \quad (5),$$

from 0 to 99% by weight of units of the general formula $$[X_j R^4_h R^3_{1-h-j} AlO_{2/2}] \quad (6) \text{ and}$$

from 0 to 99% by weight of units of the general formula $$[AlO_{3/2}] \quad (7),$$

where $R^3$ is a hydrogen atom or identical or different monovalent, Al—C-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, g has the value 0, 1 or 2, h has the value 0 or 1, i has the value 0, 1, or 2, j has the value 0, or 1, and wherein the sum of the coefficients for X, $R^3$ satisfies the valence of the aluminum atom to which they are bonded.

5. The particles of claim 3, wherein the aluminoxane content of the particles comprises from 0.5 to 99% by weight of units of the general formula $$[X_i R^4_g R^3_{2-g-i} AlO_{1/2}] \quad (5),$$

from 0 to 99% by weight of units of the general formula $$[X_j R^4_h R^3_{1-h} AlO_{2/2}] \quad (6) \text{ and}$$

from 0 to 99% by weight of units of the general formula $$[AlO_{3/2}] \quad (7),$$

where $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, g has the value 0, 1 or 2, h has the value 0 or 1, i has the value 0, 1, or 2, j has the value 0, or 1, and wherein the sum of the coefficients for X, $R^3$ and $R^4$ satisfies the valence of the aluminum atom to which they are bonded.

6. The particles of claim 2, wherein the monomeric, organoaluminum compound content comprises compounds of the general formulae $$R^3_{3-i-j}R^4_iAlX_j \quad (8),$$

$$R^5_2AlER^5ER^5 \quad (9),$$

$$(CH_2)_sAl\text{-}ER^5 \quad (10),$$

(11)

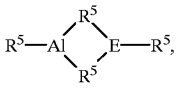

(12)

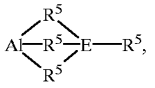

where $R^5$ is a $C_1$- to $C_{30}$-hydrocarbon radical,

E is individually selected from the group consisting of oxygen, sulfur and $NR^6$, $R^6$ is a hydrogen atom or a radical $R^5$, s is an integer from 3 to 30, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, i has the value 0, 1, 2 or 3, j has the value 0, 1 or 2, and the sum of i+j≦3.

7. The particles of claim 3, wherein the monomeric, organoaluminum compound content comprises compounds of the general formulae $$R^3_{3-i-j}R^4_iAlX_j \quad (8),$$

$$R^5_2AlER^5ER^5 \quad (9),$$

$$(CH_2)_sAl\text{-}ER^5 \quad (10),$$

(11)

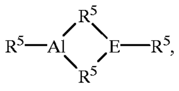

-continued (12)

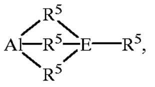

where $R^5$ is a $C_1$- to $C_{30}$-hydrocarbon radical,

E is individually selected from the group consisting of oxygen, sulfur and $NR^6$, $R^6$ is a hydrogen atom or a radical $R^5$, s is an integer from 3 to 30, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, i has the value 0, 1, 2 or 3, j has the value 0, 1 or 2, and the sum of i+j≦3.

8. The particles of claim 4, wherein the monomeric, organoaluminum compound content comprises compounds of the general formulae $$R^3_{3-i-j}R^4_iAlX_j \quad (8),$$

$$R^5_2AlER^5ER^5 \quad (9),$$

$$(CH_2)_sAl\text{-}ER^5 \quad (10),$$

(11)

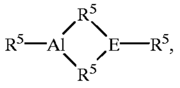

(12)

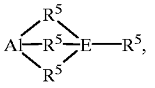

where $R^5$ is a $C_1$ to $C_{30}$-hydrocarbon radical,

E is individually selected from the group consisting of oxygen, sulfur and $NR^6$, $R^6$ is a hydrogen atom or a radical $R^5$, s is an integer from 3 to 30, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, i has the value 0, 1, 2 or 3, j has the value 0, 1 or 2, and the sum of i+j≦3.

9. The particles of claim 2 wherein the oligomeric organoaluminum compound content comprises at least one compound of the general formula $$cyclo\text{-}(R^3AlO_{2/2})_k(R^4AlO_{2/2})_l(XAlO_{2/2})_m \quad (13),$$

where k, l and m are each an integer from 3 to 30, with the proviso that the sum k+l+m is at least three, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, and X is a halogen atom.

10. The particles of claim 3, wherein the oligomeric organoaluminum compound content comprises at least one compound of the general formula $$\text{cyclo-}(R^3AlO_{2/2})_k(R^4AlO_{2/2})_l(XAlO_{2/2})_m \quad (13),$$

where k, l and m are each an integer from 3 to 30, with the proviso that the sum k+l+m is at least three, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, and X is a halogen atom.

11. The particles of claim 4, wherein the oligomeric organoaluminum compound content comprises at least one compound of the general formula $$\text{cyclo-}(R^3AlO_{2/2})_k(R^4AlO_{2/2})_l(XAlO_{2/2})_m \quad (13),$$

where k, l and m are each an integer from 3 to 30, with the proviso that the sum k+l+m is at least three, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, and X is a halogen atom.

12. The particles of claim 5, wherein the oligomeric organoaluminum compound content comprises at least one compound of the general formula $$\text{cyclo-}(R^3AlO_{2/2})_k(R^4AlO_{2/2})_l(XAlO_{2/2})_m \quad (13),$$

where k, l and m are each an integer from 3 to 30, with the proviso that the sum k+l+m is at least three, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, and X is a halogen atom.

13. The particles of claim 6, wherein the oligomeric organoaluminum compound content comprises at least one compound of the general formula $$\text{cyclo-}(R^3AlO_{2/2})_k(R^4AlO_{2/2})_l(XAlO_{2/2})_m \quad (13),$$

where k, l and m are each an integer from 3 to 30, with the proviso that the sum k+l+m is at least three, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, and X is a halogen atom.

14. The particles of claim 2, wherein the oligomeric organoaluminum compound content comprises at least one compound of the general formula $$R^3_{2-q-r}R^4_qX_rAlO—(R^3AlO_{2/2})_n(R^4AlO_{2/2})_o(XAlO_{2/2})_pAlR^3_{(2-q-r)}R^4_qX_r \quad (14),$$

where n, o and p are each integers from 0 to 50, q and r each have a value of 0, 1 or 2, $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, and $q+r \leqq 2$.

15. The particles of claim 3, wherein the oligomeric, linear organoaluminum compound content comprise compounds of the general formula $$R^3_{2-q-r}R^4_qX_rAlO—(R^3AlO_{2/2})_n(R^4AlO_{2/2})_o(XAlO_{2/2})_pAlR^3_{(2-q-r)}R^4_qX_r \quad (14),$$

where n, o and p are each integers from 0 to 50, q and r each have a value of 0, 1 or 2, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, and $q+r \leqq 2$.

16. The particles of claim 4, wherein the oligomeric, linear organoaluminum compound content comprise compounds of the general formula $$R^3_{2-q-r}R^4_qX_rAlO—(R^3AlO_{2/2})_n(R^4AlO_{2/2})_o(XAlO_{2/2})_pAlR^3_{(2-q-r)}R^4_qX_r \quad (14),$$

where n, o and p are each integers from 0 to 50, q and r each have a value of 0, 1 or 2, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, and $q+r \leqq 2$.

17. The particles of claim 6, wherein the oligomeric, linear organoaluminum compound content comprise compounds of the general formula $$R^3_{2-q-r}R^4_qX_rAlO—(R^3AlO_{2/2})_n(R^4AlO_{2/2})_o(XAlO_{2/2})_pAlR^3_{(2-q-r)}R^4_qX_r \quad (14),$$

where n, o and p are each integers from 0 to 50, q and r each have a value of 0, 1 or 2, and $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, X is a halogen atom, and $q+r \leqq 2$.

18. A process for the preparation of particles as claimed in claim 2, wherein organoaluminum compounds selected from compounds of the general formulae (8) to (13)

$$R_{3-i-j}R^4_iAlX_j \quad (8),$$

$$R^5_2AlER^5ER^5 \quad (9),$$

$$(CH_2)_sAl\text{-}ER^5 \quad (10),$$

(11)

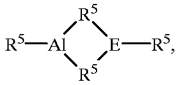

(12)

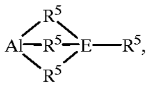

and $$\text{cyclo-}(R^3AlO_{2/2})_k(R^4AlO_{2/2})_l(XAlO_{2/2})_m \quad (13),$$

are reacted with compounds carrying hydroxyl groups in the presence of organopolysiloxane gel microparticles having a diameter of from 5 to 200 nm, wherein $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, $R^5$ is a $C_1$- to $C_{30}$-hydrocarbon radical, s is an integer from 3 to 30, and E is individually selected from the group consisting of oxygen, sulfur and $NR^6$, $R^6$ is a hydrogen atom or a radical $R^5$, X is a halogen atom, g has the value 0, 1 or 2, h has the value 0 or 1, i has the value 0, 1, 2 or 3, j has the value 0, 1 or 2, and $i+j \leqq 3$.

19. A process for the preparation of particles as claimed in claim 3, wherein organoaluminum compounds selected from compounds of the general formulae (8) to (13)

$$R_{3-i-j}R^4_iAlX_j \quad (8),$$

$$R^5_2AlER^5ER^5 \quad (9),$$

$$(CH_2)_sAl\text{-}ER^5 \quad (10),$$

(11)

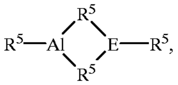

(12)

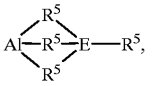

and $$\text{cyclo-}(R^3AlO_{2/2})_k(R^4AlO_{2/2})_l(XAlO_{2/2})_r \quad (13),$$

are reacted with compounds carrying hydroxyl groups in the presence of organopolysiloxane gel microparticles having a diameter of from 5 to 200 nm, wherein $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, $R^5$ is a $C_1$- to $C_{30}$-hydrocarbon radical, s is an integer from 3 to 30, and E is individually selected from the group consisting of oxygen, sulfur and $NR^6$, $R^6$ is a hydrogen atom or a radical $R^5$, X is a halogen atom, i has the value 0, 1, 2 or 3, j has the value 0, 1 or 2, and k, l and m are each an integer from 3 to 30, with the proviso that the sum k+l+m is at least 3, and $i+j \leqq 3$.

20. A process for the preparation of particles as claimed in claim 4 , wherein organoaluminum compounds selected from compounds of the general formulae (8) to (13)

$$R_{3-i-j}R^4_iAlX_j \quad (8),$$

$$R^5_2AlER^5ER^5 \quad (9),$$

$$(CH_2)_sAl\text{-}ER^5 \quad (10),$$

(11)

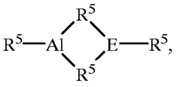

(12)

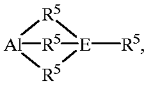

and $$\text{cyclo-}(R^3AlO_{2/2})_k(R^4AlO_{2/2})_l(XAlO_{2/2})_m \quad (13),$$

are reacted with compounds carrying hydroxyl groups in the presence of organopolysiloxane gel microparticles having a diameter of from 5 to 200 nm, wherein $R^3$ is a hydrogen atom or identical or different monovalent, Al—C-bonded, SiC-bonded $C_1$- to $C_{30}$-hydrocarbon radicals optionally carrying functional groups, $R^4$ is a hydrogen atom or identical or different monovalent, Al—O—C-bonded $C_1$- to $C_{30}$-hydrocarbon radicals optionally carrying functional groups, $R^5$ is a $C_1$- to $C_{30}$-hydrocarbon radical, s is an integer from 3 to 30, and E is a individually selected from the group consisting of oxygen, sulfur and $NR^6$, $R^6$ is a hydrogen atom or a radical $R^5$, X is a halogen atom, i has the value 0, 1, 2 or 3, and j has the value 0, 1 or 2, and k, l and m are each an integer from 3 to 30, with the proviso that the sum k+l+m is at least 3, and $i+j \leqq 3$.

21. In a process for the polymerization, oligomerization, or cyclization of olefins with a metal catalyst from subgroups 4, 5, 6, and 8–10 of the Periodic table, the improvement comprising employing the particles of claim 1 as a cocatalyst.

* * * * *